Oct. 8, 1957     D. O. NASH     2,809,291
TRANSMISSION AND REVOLUTION COUNTING APPARATUS
Filed April 29, 1955     2 Sheets-Sheet 1

INVENTOR
DUDLEY O. NASH
BY
ATTORNEY

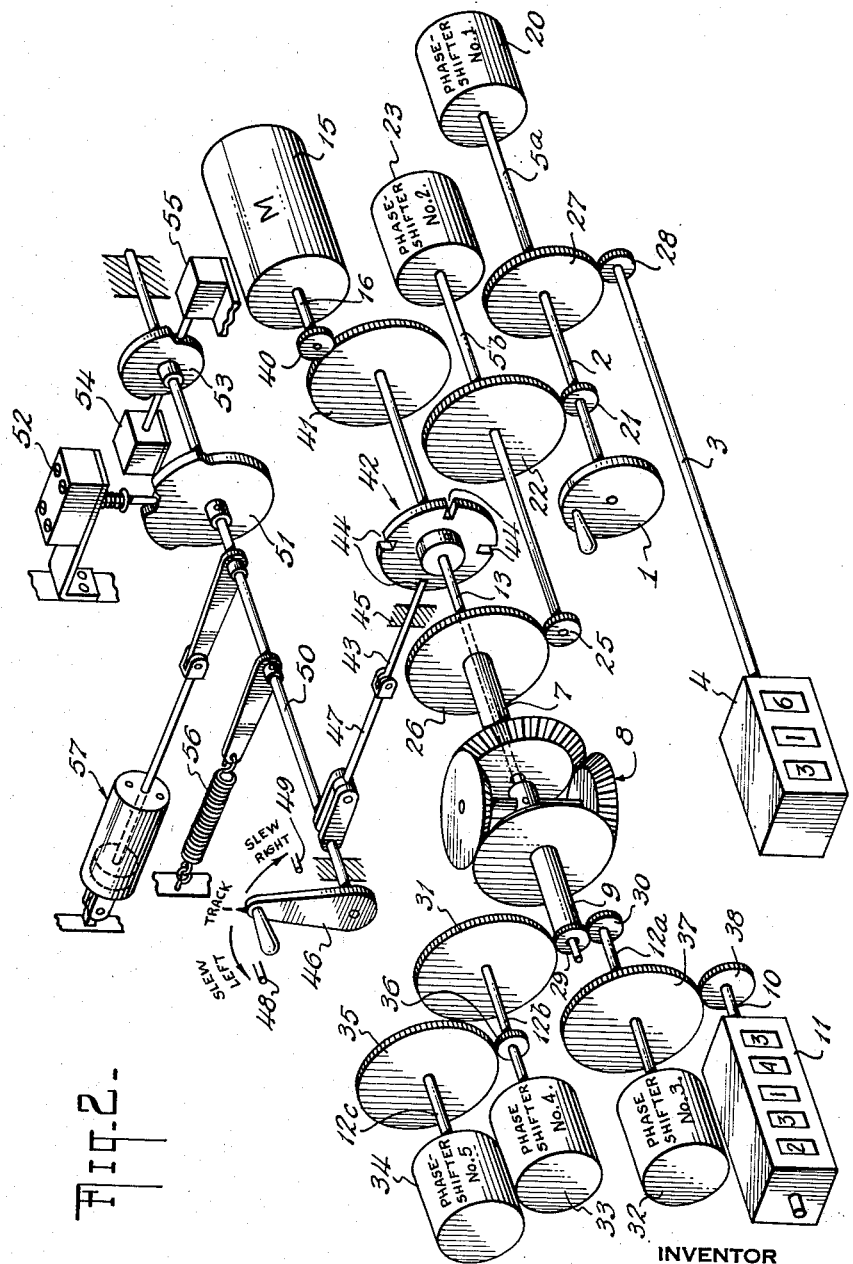

United States Patent Office 2,809,291
Patented Oct. 8, 1957

2,809,291

TRANSMISSION AND REVOLUTION COUNTING APPARATUS

Dudley O. Nash, Levittown, N. Y., assignor to Sperry Rand Corporation, a corporation of Delaware Application April 29, 1955, Serial No. 504,995

8 Claims. (Cl. 250—27)

The present invention relates to transmission and revolution counting apparatus. More particularly, it concerns an improved multi-wheel revolution counter arrangement wherein one or more of the higher order counter wheels are responsive to the operation of a slewing drive member for rapidly making coarse or large adjustments of revolution count and wherein all of the wheels are responsive to the operation of a second drive member which is provided principally for making fine adjustment of revolution count.

Multi-wheel revolution counters are commonly employed wherever a visual indication of the number of revolutions made by a driving member is required. The ordinary mileage meter associated with automobile speedometers in an everyday example of a multi-wheel revolution counter. In fact, such a device is very similar to the multi-wheel revolution counters used in direct reading loran systems. However, the latter counters are calibrated in terms of microseconds, and respond to the number of revolutions through which one or more phase shifters are driven by a tracking drive member to align a locally generated pedestal pip on an oscilloscope screen with a pip received from a loran slave transmitting station.

The present invention is particularly well-suited for loran systems, since it is frequently necessary in such systems to make large phase shift adjustments in exceedingly short spaces of time. The time operationally permissible for these adjustments and the physical limitations of the usual multi-wheel revolution counter in regard to the speed at which it can be safely driven may render it impossible to make a large adjustment rapidly enough without some special arrangement for driving or slewing one or more of the normally slower-moving or higher order wheels independently of the normally faster-moving or lower order wheels during the adjustment period.

Special slewing arrangements in the past have employed mechanical differentials, detent devices, and clutches in various manners to secure the desired selective operation. The present invention also employs a mechanical differential and a detent device; however, according to a principal feature of the invention, no clutch is employed and only one differential and one detent device are needed due to a novel manner of coupling the elements to revolution counting wheels and other positionable devices driven, according to the operating mode desired, by a slewing or rapid adjustment drive member and a tracking or slow adjustment drive member.

Another feature of the invention is the provision of reversible electromotive slewing drive means under the control of a manual control device novelly adapted to control an arrangement for synchronizing the slewed portion of the counter apparatus with the unslewed portion thereof.

Another feature is the provision, in a system for producing a first series of electrical pulses which are adjustably time-spaced pulse for pulse from a second series of electrical pulses, of an improved arrangement for fine and coarse adjustment of a plurality of phase-shifters and for providing an accurate indication of the extent of such adjustments.

The foregoing and still other features of the invention will become more apparent upon reference to the drawings, wherein:

Fig. 2 is a schematic diagram showing details of the mechanical coupling between elements and of the locking and synchronizing apparatus of Fig. 1.

Figure 1:
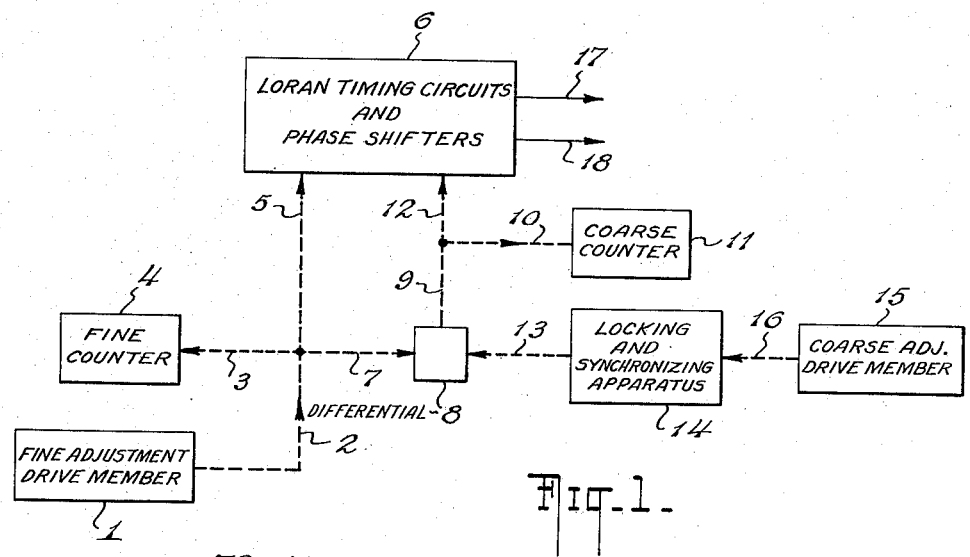
Fig. 1 is a schematic block diagram of a loran timing system embodying the present invention.

Referring to the loran timing system depicted in block form in Fig. 1, a fine adjustment drive member 1 is provided with a mechanical coupling 2 for jointly driving the input shaft 3 of a fine revolution counter 4 and a first input shaft 5 of an arrangement 6 of loran timing circuits and phase-shifters. Through coupling 2, fine drive member 1 also drives one input shaft 7 of a mechanical differential 8 whose output shaft 9 is jointly drivably coupled to the input shaft 10 of a coarse revolution counter 11 and to a second input shaft 12 of arrangement 6. By maintaining the other input shaft 13 of differential 8 in a locked condition, an actuation of fine drive member 1 drives both the counters 4, 11 and the input shafts 5, 12 of arrangement 6.

Locking of differential input shaft 13 is accomplished through a locking and synchronizing apparatus 14 which is unlocked by actuation of a coarse adjustment drive member 15 having its output shaft 16 coupled to apparatus 14 and differential input shaft 13. The load reflected to differential input shaft 7 is much greater than the load reflected to differential output shaft 9 so that when coarse drive member 15 is actuated to drive differential input shaft 13, the motion of the latter is transmitted to differential output shaft 9, but not to differential input shaft 7. Thus, actuation of coarse drive member 15 drives coarse counter 11 and input shaft 12 of arrangement 6 independently of fine counter 4 and input shaft 5 of arrangement 6.

Arrangement 6 includes fine phase-shifting apparatus connected to be driven by shaft 5 and coarse phase-shifting apparatus connected to be driven by shaft 12. The electrical input and output connections of each phase-shifting apparatus are outside the scope of the present invention. Suffice it to say, therefore, that they are such as to supply separate pedestal pulses respectively on output leads 17, 18 of arrangement 6 which are precisely spaced by an interval of time proportional to the total number of degrees through which input shaft 5 is rotated. Such connections to phase-shifting apparatus are well-known and may be viewed, for example, in U. S. Patent 2,552,556 issued May 15, 1951, to E. J. Isbister.

Referring to the detailed mechanical showing of the system in Fig. 2, fine adjustment member 1 of Fig. 1 is illustrated as a hand-crank whose shaft 2 is directly connected to the shaft 5a of a first phase-shifter 20. A connection is also made from crankshaft 2 via a pair of reduction gears 21 and 22 to the shaft 5b of a second phase-shifter 23. Shaft 5b is connected via a pair of reduction gears 25, 26 to input shaft 7 of differential 8 which may, for example, be a bevel gear type wherein shaft 7 is hollow to accommodate the other differential input shaft 13. And, shaft 3 of fine counter 4 is connected to be driven from crankshaft 2 through a pair of step-up gears 27, 28.

If differential input shaft 13 is locked against rotation, the turning of crank 1 will result in a proportional turning of differential output shaft 9 which is provided with a pinion 29 meshing with a pinion 30 and a gear 31 respectively on the shafts 12a and 12b of third and fourth phase-shifters 32, 33. A fifth phase-shifter 34 having a drive shaft 12c is provided with a gear 35 on said shaft driven by a pinion 36 fixed to shaft 12b of phase-shifter 33. And a gear 37 fixed to shaft 12a of phase-shifter 32 meshes with a pinion 38 fixed on shaft 10 of coarse counter 11.

The gear trains coupling the various elements are proportioned so that the first or right-hand wheel of coarse counter 11, as viewed in Fig. 2, is driven by crank 1 at the same speed as the last or left-hand wheel of fine counter 4. Moreover, the gearing is such that phase shifters 20, 23, 32, 33 and 34 are driven at successively lower speeds which are related to the frequencies of their electrical inputs in the general manner described in the aforesaid patent to Isbister. Thus, a turning of crank 1 will drive or track all of the phase-shifters through different angular distances; and if turned far enough, crank 1 will actuate all of the revolution counter wheels of counters 4, 11. The last wheel to be actuated will, of course, be the highest order wheel in counter 11, i. e., the left-hand wheel as viewed in Fig. 2.

Five counter wheels are indicated in Fig. 2 for counter 11 and may, for example, read, left to right, as ten-thousandths, thousandths, hundredths, tenths and units of microseconds. If such is the case, then the three counter wheels indicated for counter 4 will read, left to right, as units, tenths, and hundredths of microseconds. The units wheel of counter 11, duplicating the units wheel of counter 4, is used to initially synchronize counter 11 to counter 4 and is preferably blanked out when initial synchronization is accomplished.

In order to slew the phase-shifters and counters to a new setting in a small fraction of the time it would require to do the job with fine adjustment crank 1, differential input shaft 13 is unlocked and the coarse adjustment member 15, preferably a motor which is readily controllable in speed and direction, is energized to run at slewing speed. The output shaft 16 of slewing motor 15 is connected via a pair of reduction gears 40, 41 and a rim-notched disc 42, forming part of the locking and synchronizing apparatus 14 of Fig. 1, to shaft 13. The load reflected by gears 26, 25, 22, 21, 27 and 28 to differential input shaft 7 is much greater than the load reflected by gears 29, 30, 37, 38, 31, 36 and 35 to differential output shaft 9 so that when shaft 13 is unlocked and slewing motor 15 is energized, shaft 7 is unaffected rotation-wise while differential output shaft 9 is rotated to drive coarse counter 11 and phase-shifters 32—34 independently of fine counter 4 and phase-shifters 20, 23.

Differential input shaft 13 is locked by the insertion of a pin 43 in one of a plurality of notches 44 on the rim of disc 42. Pin 43 is mounted in a support 45 for longitudinal sliding movement radially of disc 42, and is drawn clear of the disc when a pivoted manual control lever 46 to which the pin is linked by a connecting link 47 is moved through a given angular distance to stops 48, 49 on opposite sides of a preselected neutral or centered position for the lever. Control lever 46 is also rigidly connected to a rotatably-mounted shaft 50 having a first cam 51 affixed thereto for actuating a switch 52 and a second cam 53 affixed to the shaft for actuating a pair of switches 54, 55. A spring 56 is connected to shaft 50 for restoring control lever 46 to its centered position when released, and a dashpot 57 is connected to the shaft to delay such spring-induced restoration for a predetermined time interval.

Switches 52 and 54, 55 are connected in circuit with slewing motor 15 and a source of power for the motor. When control lever 46 is in its centered position between the stops 48 and 49, the condition of the switches is such that no power is supplied to slewing motor 15. When control lever 46 is moved away from center, the switches are placed in a condition to supply just enough power to motor 15 to tend to cause the motor to turn over at creep speed. However, lever 46 does not withdraw pin 43 from the notch it engages on disc 42 and thereby permit motor 15 to turn until the lever has traveled about half the distance to one of the stops 48, 49.

When lever 46 abuts a stop, the switches are thereby placed in a condition to supply full slewing power to motor 15, whereupon the motor slews coarse counter 11 and phase-shifters 32—34 until lever 46 is released. As lever 46 gradually returns to center under the influence of spring 56 and dashpot 57, the switches remove full slewing power from motor 15 and supply the reduced power for turning the motor over at creep speed. The slewing momentum of motor 15 is overcome when lever 46 is about half-way restored to its centered position. At this time, pin 43 contacts the rim of disc 42 and, under the resilient force of spring 56, slides into one of the notches 44 as soon as motor 15, now turning over at creep speed, positions disc 42 to place a notch in adjacent alignment with pin 43.

Notches 44 are evenly spaced on the rim of disc 42 and may total any number that insures that regardless of which notch the pin 43 slides into, counter 11 is in synchronization with counter 4. By counter synchronization, it is meant that the first wheel of counter 11 indicates the same integer as the last wheel of counter 4. Thus, in the embodiment of Fig. 2 wherein disc 42 is provided with four evenly-spaced notches, it is assumed that the gear train between counters is such that pin 43 may engage any one of the four notches after slewing and thereby lock shaft 13 so that the first or right-hand wheel of counter 11 indicates the same integer as the last or left-hand wheel of counter 4.

Figure 3:
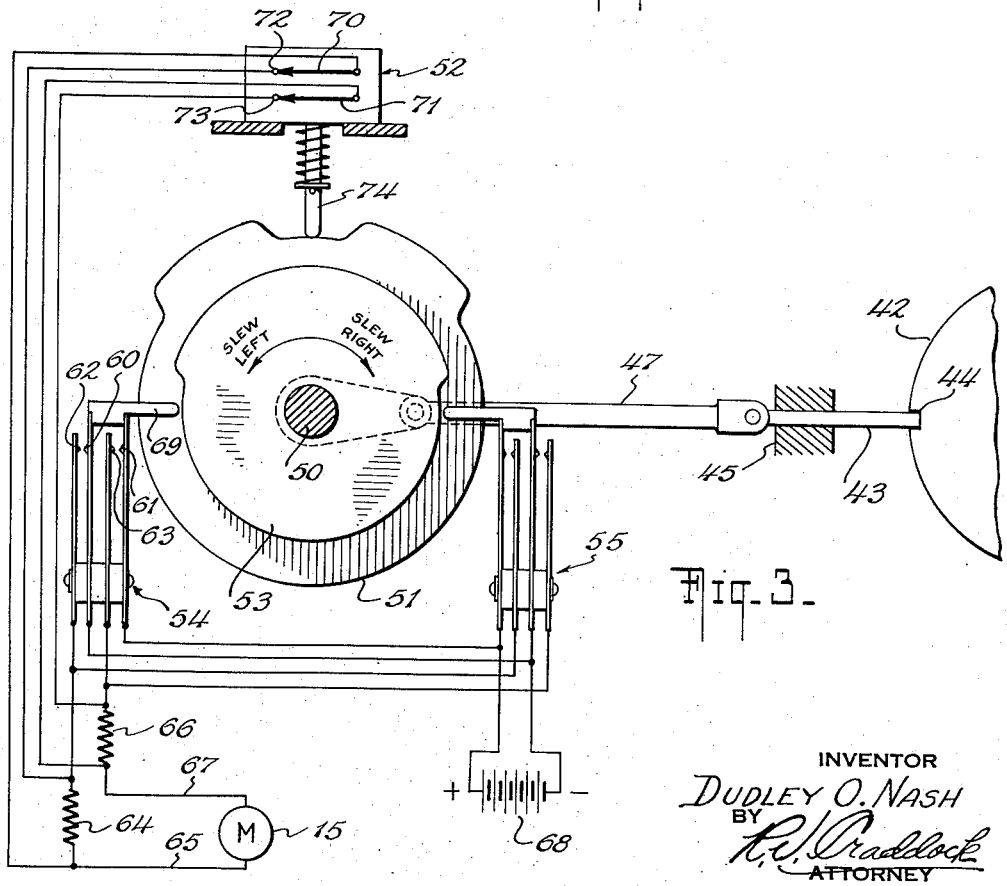
Fig. 3 is a wiring diagram of the switching arrangement of Fig. 2 for controlling the slewing and synchronizing of the system.

Switch 54 has two movable contacts 60, 61 (see Fig. 3) mounted on separate spring arms and cooperating respectively with two fixed contacts 62, 63. Fixed contact 62 is connected via a power dropping resistor 64 to one input lead 65 of slewing motor 15, while fixed contact 63 is connected via a power dropping resistor 66 to the other input lead 67 of motor 15 (Fig. 2). For illustrative purposes, slewing motor 15 is assumed to be of the D. C. variety, hence the power source for the motor is represented as a battery 68. Movable contact 60 is connected to the negative side of battery 68, while movable contact 61 is connected to the positive side of the battery. A cam follower element 69 is jointly coupled to the spring arms of movable contacts 60, 61 and rests on the rim of cam 53. Cam 53 is so shaped that when control lever 46 is in its centered position, cam follower 69 is positioned to maintain the movable contacts 60, 61 out of contact with the fixed contacts 62, 63. But when control lever is moved toward stop 48, cam follower 69 is actuated by cam 53 to bring movable contacts 60, 61 into contact with fixed contacts 62, 63, whereby to complete a circuit from battery 68 via dropping resistors 64, 66 to slewing motor 15. Cam follower 69 remains actuated in this sense throughout the travel of lever 46 to stop 48. The dropping resistors 64, 66, however, are short-circuited by means of switch 52 as soon as lever 46 reaches stop 48, thereby to place the full battery voltage across motor 15 to run the motor at slewing speed.

Switch 52 has two movable contacts 70, 71 cooperating respectively with two fixed contacts 72, 73. A cam follower element 74 is jointly coupled to the movable contacts 70, 71 and rests on the rim of cam 51. Cam 51 is so shaped that when control lever 46 is either in its centered position or against one of its stops, cam follower 74 is positioned to maintain movable contacts 70, 71 in contact with fixed contacts 72, 73 for short-circuiting the respective dropping resistors 64, 66. But when control lever is intermediate its centered position and one of its stop positions, cam follower 74 is actuated by cam 51 to open the contact between movable contacts 70, 71 and fixed contacts 72, 73, whereby to place the dropping resistors in circuit with battery 68 and motor 15 so that the motor is energized to run at creep speed. Thus, for any position of control lever 46 intermediate its centered position and one of its stop positions, motor 15 is partially energized for creep speed; while for a stop position of control lever 46, motor 15 is fully energized for slewing.

Switch 55 is identical to switch 54, but is connected to apply a reversed polarity voltage from battery 68 to leads 65, 67 of motor 15 when its contacts are closed by cam 53 in response to movement of control lever 46 toward stop 49. Thus, slewing motor 15 is energized to run in one direction or the other, depending on the direction in which control lever 46 is displaced from its centered position, and the amount of energization that motor 15 receives depends on whether lever 46 is held against a stop or is positioned intermediate of its centered position and a stop position.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A transmission and revolution counting mechanism comprising a first plurality of drivable members coupled together for being driven at different relative speeds, a second plurality of drivable members coupled together for being driven at different relative speeds, first and second revolution counter devices, a differential gear unit having an output shaft drivably coupled to said first counter device and said first plurality of drivable members, a slewing drive member drivably coupled to a first of said differential input shafts, a tracking drive member jointly drivably coupled to the second of said differential input shafts, said second counter device and said second plurality of drivable members, and means interposed in the coupling between said slewing member and said first differential input shaft for preventing the latter from being driven except by said slewing member, the respective coupling loads reflected to said second differential input shaft and said differential output shaft being such as to prevent said second shaft from being driven except by said tracking drive member, whereby said tracking drive member may drive all of said drivable members and both counter devices, while said slewing drive member may drive only said first plurality of drivable members and said first counter device.

2. In a system for producing a first series of pulses which are adjustably time-spaced pulse for pulse from a second series of pulses, phase-shift and indicating apparatus comprising a plurality of rotatably adjustable phase-shifters, first means mechanically coupling a given number of said phase-shifters together for simultaneous adjustment with the adjustment of one of said given number, second means coupling the remaining number of said phase-shifters together for simultaneous adjustment with the adjustment of one of said remaining number, first and second revolution counter devices, a mechanical differential element having an output shaft and a pair of input shafts, said output shaft being drivably coupled jointly to said first counter device and said given number of adjustable phase shifters, a slewing drive member drivably coupled to a first of said differential input shafts, a tracking drive member drivably coupled jointly to the second of said differential input shafts, said second counter device, and said remaining number of adjustable phase-shifters, and means for preventing said first differential input shaft from being driven except by said slewing drive member, the respective coupling loads reflected to said second input shaft and said output shaft being such as to prevent said second input shaft from being driven except by said tracking drive member, whereby said tracking drive member may drive all of said phase-shifters and both counter devices, while said slewing drive member may drive only said given number of phase-shifters and said first counter device.

3. In a system employing a plurality of rotatably adjustable phase-shifters for time delaying a first recurrent pulse with respect to a second recurrent pulse according to the adjustment given said phase-shifters, first means mechanically coupling a given number of said phase-shifters together for simultaneous but respectively unequal adjustment with the adjustment of one of said given number, second means mechanically coupling the remaining number of said phase-shifters together for simultaneous but respectively unequal adjustment with the adjustment of one of said remaining number, first and second revolution counter devices, a mechanical differential element having an output shaft and a pair of input shafts, said output shaft being drivably coupled jointly to said first counter device and said given number of adjustable phase-shifters, a slewing drive member drivably coupled to a first of said differential input shafts, a tracking drive member drivably coupled jointly to the second of said differential input shafts, said second counter device, and said remaining number of adjustable phase-shifters, and means for preventing said first differential input shaft from being driven except by said slewing drive member, the respective coupling loads reflected to said second input shaft and said output shaft being such as to prevent said second input shaft from being driven except by said tracking drive member, whereby said tracking drive member may drive all of said phase-shifters and both counter devices, while said slewing drive member may drive only said given number of phase-shifters and said first counter device.

4. In a loran system, apparatus for driving first and second pluralities of adjustable phase shifters and providing an indication of the extent of such driving, said apparatus comprising means coupling said first plurality of phase shifters together for being driven at respectively different speeds, means coupling said second plurality of phase shifters together for being driven at respectively different speeds, first and second revolution counted devices, a differential gear unit having an output shaft drivably coupled jointly to said first counter device and said first plurality of phase shifters, a slewing drive member drivably coupled to a first of said differential input shafts, a tracking drive member drivably coupled jointly to the second of said differential input shafts, said second counter device and said second plurality of phase shifters, and means for preventing said first differential input shaft from being driven except by said slewing drive member, said second differential input shaft being prevented from being driven execpt by said tracking drive member by the coupling load reflected to said second differential input shaft.

5. A transmission and revolution counting mechanism comprising a mechanical differential element having first and second input shafts and an output shaft, a braking member fixed to said first shaft for rotation therewith, a first drive member drivably coupled to said first shaft, locking means mounted for movement to engage said braking member to lock said first shaft against rotation, power means operable to actuate said first drive member to drive at a given slewing speed, a control element manually displaceable from a neutral position to a stop position for operating said power means and moving said locking means to disengage the same from said braking member, means connected to said control element for gradually restoring said control element to its neutral position when released and reducing the speed of said first drive member during the restoration period from said slewing speed to a given creep speed, said locking means reengaging said braking member within the time that said first drive member is driven at said creep speed, a first revolution counter device, a second drive member drivably coupled jointly to said first counter device and said second differential input shaft, and a second revolution counter coupled to said differential output shaft to be driven thereby, the load reflected to said second shaft being sufficiently in excess of the load reflected to said output shaft so that said second counter is drivable by said first drive member independently of said first counter, both counters being drivable by said second drive member when said control element occupies said neutral position thereof.

6. The mechanism of claim 5 wherein the braking member includes means for preventing the first shaft from being locked in a position to place the second revolution counter out of synchronism with the first revolution counter.

7. A transmission and revolution counting mechanism comprising a mechanical differential element having first and second input shafts and an output shaft, first drive means connected to said first differential input shaft and operable in a first sense to rotate said first shaft at a given slewing speed, said first drive means being operable in a second sense to rotate said first shaft at a given creep speed, manual control means movable from a neutral position to a stop position, means responsive to the arrival of said control means at said stop position for operating said first drive means in said first sense so long as said control means remains at said stop position, means coupled to said control means for gradually restoring said control means to its neutral position when said control means is released, means responsive to the restoring movement of said control means for operating said first drive means in said second sense, means coupled to said control means and actuated thereby during the operation of said first drive means in said second sense for locking said first shaft against rotation, a first revolution counter device, second drive means drivably connected jointly to said first counter device and said second differential input shaft, and a second revolution counter coupled to said differential output shaft to be driven thereby, the load reflected to said second shaft being sufficiently in excess of the load reflected to said output shaft so that said second counter is drivable by said first drive means independently of said first counter, both counters being drivable by said second drive means when said control means occupies said neutral position thereof.

8. A transmission and revolution counting mechanism comprising a differential gear having first and second input shafts and an output shaft, a disc-like member fixed to said first differential input shaft for rotation therewith, said disc-like member having a notch in the rim thereof, a slewing motor drivably coupled to said first differential input shaft, a pin mounted for translatory movement radially of said disc-like member for engaging said notch to lock said disc-like member and said first differential input shaft against rotation, motor energizing means including a switch closable to energize said motor to run at a given slewing speed, a pivotal control element manually displaceable through a given angular distance from a neutral position for closing said switch and moving said pin to disengage the same from said notch, resilient means connected to said control element for restoring said element to its neutral position upon its manual release so as to open said switch and move said pin to resiliently bear against the rim of said disc-like member, time-delay means for delaying the complete restoration of said control element to said neutral position by a preselected time interval, means actuated by said control element during said time interval for energizing said motor to run at a preselected creep speed substantially less than said slewing speed for rotating said disc-like member until said pin engages said notch, a first revolution counter device, a drive shaft drivably coupled jointly to said first counter device and said second differential input shaft, and a second revolution counter coupled to said differential output shaft to be driven thereby, the load reflected to said second differential input shaft being in excess of the load reflected to said differential output shaft, whereby said second counter is drivable by said motor independently of said first counter and both counters are drivable by said drive shaft.

References Cited in the file of this patent
UNITED STATES PATENTS

| | | |
|---|---|---|
| 2,484,034 | Isbister | Oct. 11, 1949 |
| 2,552,556 | Isbister | May 15, 1951 |